United States Patent [19]
Hibler et al.

[11] Patent Number: 5,160,070
[45] Date of Patent: Nov. 3, 1992

[54] REVERSE BULGED FORWARD ACTING SCORED RUPTURE DISC BULKHEAD STRUCTURE FOR MULTI-STAGE ROCKET MOTOR

[75] Inventors: Donald R. Hibler, Bates City; James O. Hinrichs, Odessa, both of Mo.

[73] Assignee: Fike Corporation, Blue Springs, Mo.

[21] Appl. No.: 651,338

[22] PCT Filed: Aug. 11, 1988

[86] PCT No.: PCT/US89/03425

§ 371 Date: Mar. 25, 1991

§ 102(e) Date: Mar. 25, 1991

Related U.S. Application Data

[63] Continuation-in-part of Ser. No. 231,204, Aug. 11, 1988, abandoned.

[51] Int. Cl.$^5$ .............................................. F02K 9/28
[52] U.S. Cl. ....................................... 60/250; 60/254
[58] Field of Search ................ 60/250, 251, 253, 254, 60/245, 256; 102/374

[56] References Cited

U.S. PATENT DOCUMENTS

| | | | |
|---|---|---|---|
| 3,564,845 | 2/1971 | Friedman, Jr. et al. | 60/250 |
| 3,568,448 | 3/1971 | Webb, Jr. | 60/250 |
| 3,879,942 | 4/1975 | Dorn et al. | 60/254 |
| 4,075,832 | 2/1978 | Diesinger et al. | 60/245 |
| 4,104,878 | 8/1978 | Chase | 60/245 |
| 4,505,180 | 3/1985 | Hinrichs | 60/250 |
| 4,738,099 | 4/1988 | Hibler, Sr. et al. | 60/253 |
| 4,766,726 | 8/1988 | Tackett et al. | 60/255 |
| 4,829,765 | 5/1989 | Bolieau et al. | 60/250 |
| 4,841,724 | 6/1989 | Hall et al. | 60/245 |
| 4,972,673 | 11/1990 | Carrier | 60/253 |

FOREIGN PATENT DOCUMENTS 0085356 4/1991 Japan ............................ 60/250

Primary Examiner—Richard A. Bertsch
Assistant Examiner—Timothy S. Thorpe
Attorney, Agent, or Firm—Hovey, Williams, Timmons & Collins

[57] ABSTRACT

Rupture disc bulkhead structure for use in a multi-stage rocket motor for missiles or the like wherein the disc is supported by a multiple apertured backup member. The disc has a series of bulges which define dimples that conform to the configuration of the apertures in the backup member. Bulging of the disc is carried out under a pressure exceeding that of the withstand pressure of the supported disc. Score lines in the disc aligned with the support segments of the apertured backup member permit the disc to rupture and open at a pressure significantly lower than the back pressure withstand value. The construction provides bulkhead structure which will withstand back pressures in the range of 2,000 to 10,000 static psig yet fully open in a forward direction at a static pressure of no more than about 100 to 400 psig.

13 Claims, 1 Drawing Sheet

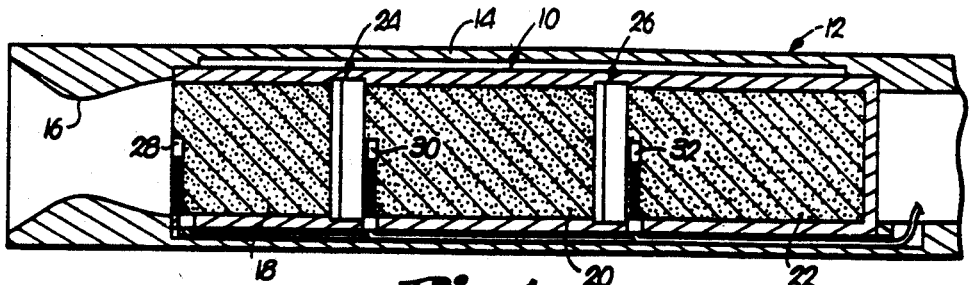
Fig. 1.
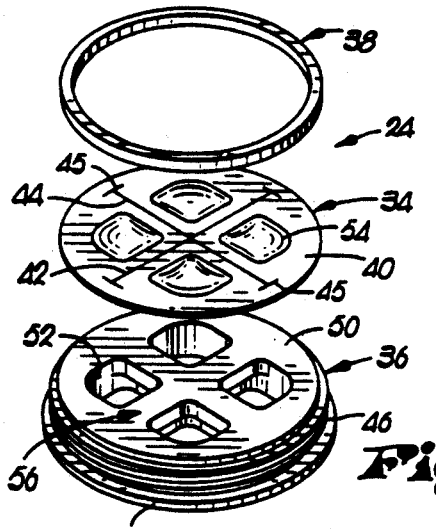
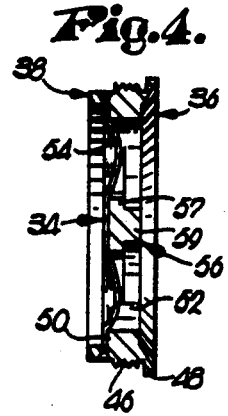
Fig. 4.
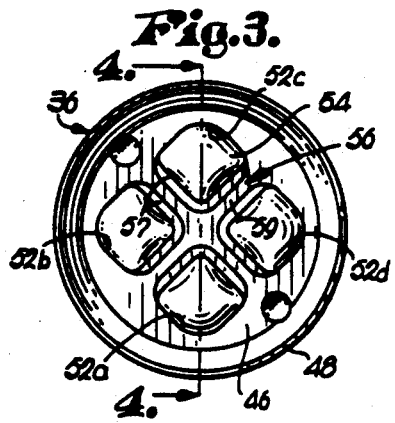
Fig. 3.
Fig. 2.
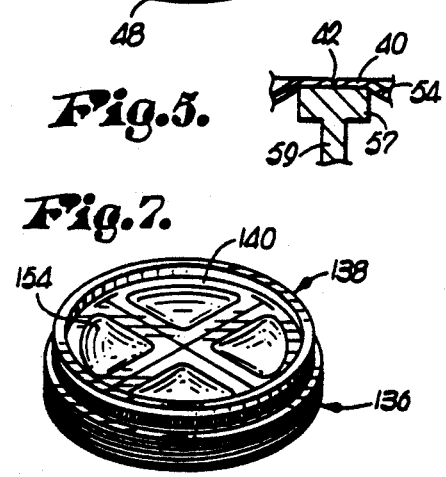
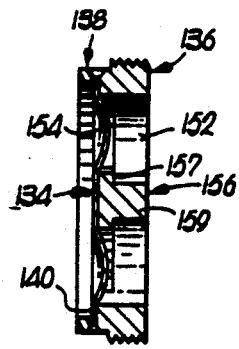
Fig. 8.
Fig. 7.
Fig. 9.
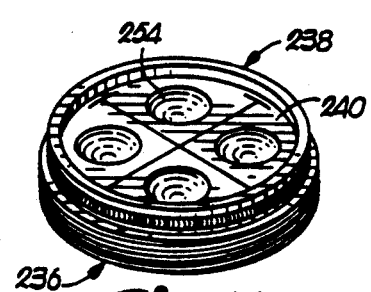
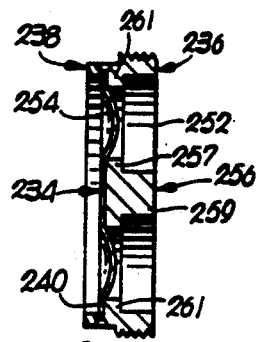
Fig. 6.
Fig. 10. Fig. 11.

REVERSE BULGED FORWARD ACTING SCORED RUPTURE DISC BULKHEAD STRUCTURE FOR MULTI-STAGE ROCKET MOTOR

This application is a continuation-in-part of application Ser. No. 07/231,204, filed Aug. 11, 1988 now abandoned.

BACKGROUND OF THE INVENTION

1. Field of the Invention

This invention relates to bulkhead structure for multi-stage rocket motors and especially to a reverse bulged forward acting scored rupture disc bulkhead capable of withstanding extremely high pressures thereagainst in one direction while opening fully under a relatively low pressure in the opposite direction to allow free flow of gaseous propellant products of combustion therethrough.

2. Description of the Prior Art

Multi-stage rocket motors have found increasing usefulness in recent years because of the increased sophistication and miniaturization of missiles capable of being launched from mobile air, ground or water-based platforms. These missiles usually embody at least two propellant stages. An ignitor ignites the propellant stage in closest proximity to the discharge port of the missile casing, and additional stages are then ignited in successive order depending upon the nature of the launch and delivery trajectory established for a particular weapon.

In order to preserve the integrity of the desired missile track, especially over long distances, the propellant stages must be ignited at times which are very critical one with respect to another. If a second propellant stage is prematurely ignited before burning of the first stage has taken place to a predetermined extent, the accuracy of the missile can be compromised. Furthermore, if ignition of successive stages is delayed and does not occur at a precise time relative to preceding propellant stage ignition, the track of the missile can either be undesirably altered, or a programmed or command change will not occur as required for target impact.

A bulkhead rupture disc assembly used in a multi-stage rocket motor must not only reliably prevent backflow of gaseous propellant reaction products from the stage undergoing burning, but also must substantially instantaneously open under a much lower pressure thereagainst in the opposite direction so that there is efficient discharge of propellant combustion products. Furthermore, the bulkhead must prevent such backflow of combustion products from a preceding propellant stage while at the same time freely opening in the opposite direction upon ignition of the next succeeding stage without permitting the gaseous products from being discharged unevenly across the discharge port of the missile which will alter its directional track. Similarly, full opening of the disc must be assured to avoid obstructions in the gaseous combustion products flow path which under certain conditions might result in an explosion of the missile.

An example of the utilization of a rupture disc in a multi-stage rocket motor for missiles is illustrated and described in U.S. Pat. No. 4,738,099 of Apr. 19, 1988 which issued to the assignee hereof. In the '099 patent, a rupture disc having a series of radially extending lines of weakness projecting from the center of the disc is described for a missile having multiple propellant stages. The rupture disc has a central aperture for accommodating an axially positioned ignitor assembly for effecting ignition of the succeeding solid propellant stage.

The bulkhead rupture disc assembly of the '099 patent incorporates a dome shaped, centrally apertured metal disc supported by a complementary apertured dome support of a synthetic resin such as a phenolic composition. Although the assembly described and illustrated in that patent has utility in a number of rocket motor applications for missiles and the like, it cannot be used in small diameter rocket motors which are unable to accommodate a centrally located ignitor that is positioned within an opening in the center of the bulkhead. A bulged rupture disc unit similar in certain respects to that of the '099 patent was tested in the early 1970's by the assignee hereof, but the unit cannot be used in the present multi-stage rocket motor application because it has limited back pressure capabilities. That assembly has a large scored concavo-convex metal disc (about 2½ inches in diameter) wherein the convex face is supported against a domed metal plate of similar thickness and having a series of small perforations defining a cross-shaped pattern. The concave surface is cross scored before bulging of the disc across the entire diameter thereof which bridges the relief passage. The opening pressure is about 350–750 psi; the withstand back-pressure is limited to 2000 psi or less.

Another known rupture disc construction is illustrated and described in U.S. Pat. No. 4,505,180 of Mar. 19, 1985 which also issued to the assignee hereof. In the construction of the '180 patent, a rupture disc is provided with a metallic, frangible disc having a low pressure face and an opposed, scored high pressure face, along with an apertured backing member positioned adjacent the low pressure face. The backing member includes a plurality of webs aligned with the disc scoring which engage the low pressure face of the disc and prevent disc rupture under the influence of high burst pressures directed against the remote high pressure face, while permitting disc rupture when the relatively low burst pressures are developed adjacent the low pressure face.

Although the device disclosed in the '180 patent finds utility in a multi-stage rocket motor for missles, a number of limitations exist with the known construction. For example, it would be desirable able to provide a rupture disc assembly that has a reduced weight relative to the known construction and that further expedites a free and full opening of the disc and backing member in order to provide a clear flow path for gaseous combustion products discharged past the assembly.

SUMMARY OF THE INVENTION

The improved rupture disc bulkhead structure of this invention involves an essentially flat plate disc having a series of bulges formed therein. The disc is supported by a backup member fixedly secured thereto. The disc and backup member are both made of metal, preferably an alloy stainless steel so that the bulkhead is capable of fully withstanding the elevated temperatures encountered in multi-stage, high pressure propellant missiles.

It has now been discovered that if a relatively thin flat metal plate disc is suitably welded to a multiple apertured backup spider or member, the bulkhead structure resulting therefrom will withstand an extremely high pressure applied against the exposed face of the disc without failure, if the disc has been fabricated by a procedure which produces bulged portions that extend into and are of the same configuration as the backup member apertures directly aligned therewith. On the other hand, the bulkhead will open substantially instantaneously under a relatively low pressure thereagainst if the disc is suitably scored so that it will open readily when pressure is applied to the disc through the backup member apertures.

The bulged areas are first formed in the disc plate and the disc is thereafter scored to present lines of predetermined weakness before the disc is affixed to its support member. In this manner, there is no tendency for the disc to deform or the score lines to further weaken when a high pressure is exerted thereagainst which would tend to displace the metal of the disc, allow opening thereof along the score lines and result in premature rupture of the disc when subjected to high back pressures.

The metallic apertured backup member is of a cross-sectional shape and thickness adequate to provide support for the disc when the latter is subjected to high pressures, yet is constructed of a material that will undergo volatilization as hot propellant combustion gases flow through the backup member to erode the central part thereof to an extent that a full and unimpeded opening is provided for outflow of gases to the missile discharge port during burning of the second or respective succeeding propellant stages.

BRIEF DESCRIPTION OF THE DRAWINGS

A preferred embodiment of the invention is described in detail below, with reference to the attached drawing figures, wherein:

FIG. 1 is an essentially schematic cross-sectional representation of a missile having a casing provided with a discharge port and housing three separate propellant stages separated one from another by a rupture disc bulkhead;

FIG. 2 is an exploded perspective view of one embodiment of rupture disc bulkhead structure constructed in accordance with one embodiment of the invention and illustrating a holddown ring, the apertured and scored rupture disc, and an apertured backup member for the disc;

FIG. 3 is a plan view of the bottom of the bulkhead illustrated in FIG. 2 and showing the components in their normal integrated positions;

FIG. 4 is a vertical cross-sectional view taken along lines 4—4 of FIG. 3;

FIG. 5 is an enlarged fragmentary sectional view illustrating a score line in cross-section in a disc mounted on a backup member;

FIG. 6 is a plan view of the bulkhead as illustrated in FIG. 3 but showing the manner in which the central disc support portions of the back-up member erode away during passage of hot propellant combustion products therethrough to leave a relatively fully opened passage for discharge of such products through the port of a missile casing;

FIG. 7 is an assembled perspective view of another embodiment of the bulkhead of this invention and illustrating different shaped apertures through the disc support member, than are illustrated in the embodiment of FIG. 2;

FIG. 8 is a bottom plan view of the bulkhead shown in FIG. 7;

FIG. 9 is a vertical cross-sectional view taken along the lines 9—9 of FIG. 8;

FIG. 10 is an assembled perspective view of a third embodiment of the bulkhead of this invention and showing other types of apertures in the backup member, than previously illustrated; and FIG. 11 is a vertical cross-sectional view of the bulkhead shown in FIG. 10.

DETAILED DESCRIPTION OF THE PREFERRED EMBODIMENT

The rocket portion 10 of a typical multistage missile motor 12 is illustrated in FIG. 1. The cylindrical casing 14 of the missile 12 has a relieved outlet port 16 which permits discharge of gaseous propellant combustion products from the casing 14 upon sequential ignition of the stages. For exemplary purposes only, the missile motor 12 is depicted as storing three separate propellant stages 18, 20 and 22 respectively separated by identical rupture disc bulkheads broadly designated 24 and 26 respectively; however, it is to be understood that the bulkhead structure is equally usable in a two-stage motor or conceivably in rocket motors having more than three stages.

The propellant stages 18-22 are sequentially ignited by ignitors 28, 30 and 32 located adjacent the forwardmost face of each propellant stage respectively. Upon ignition of the first stage 18 by the ignitor 28, the gaseous products of combustion generated thereby are discharged through the port 16 thereby causing the missile to be launched from its support for traverse toward an intended target. After the propellant stage 18 has burned to a predetermined extent, the ignitor 30 ignites propellant stage 20, which is then followed by ignition of the final stage 22 of the three-stage rocket motor 20 depicted for illustrative purposes only.

The bulkheads 24 and 26 are of identical construction and therefore only one of the same need be described in detail. Accordingly, and referring initially to FIGS. 2-5 inclusive, the bulkhead structure broadly designated 24 has, as major component parts, a central rupture disc 34, a backup member 36, and a holddown ring 38.

The disc 34 is a circular, initially flat metal plate 40 such as stainless steel or nickel which has score lines 42 and 44 therein defining a crossing pattern. Lines 42 and 44 terminate in spaced relationship from the outer perimeter of the metal plate 40.

Arcuate milled grooves 45 are provided at the points of termination of the score lines 42, 44, each groove 45 extending in a direction substantially perpendicular to the line 42 or 44 which it intersects. As discussed more fully below, the arcuate milled grooves 45 lines are provided in the disc 34 to permit complete opening of the disc 34 upon ignition of the propellant stage 20. In the preferred embodiment, the grooves 45 are milled in the disc so that the burst pressure of the disc, as defined by the score lines 42, 44, remains unchanged after formation of the grooves 45. However, both the lines 42, 44 and the grooves 45 could be formed in the disc by a milling operation, if desired.

Backup member 36 is also of unitary construction, fabricated of metal such as stainless steel and provided with a central main massive body 46 provided with an annular flange 48 on one face thereof. The opposite face 50 of body 46 is flat for complementary reception of disc 34 thereover in the assembled condition of bulkhead 24. The body 46 is provided with a series of through apertures 52 which in the embodiment illustrated are of generally rectangular configuration and arranged in symmetrical relationship about the axis of body 46. Preferably, four apertures 52 are provided with each having two innermost, right angle legs 52a and 52b which merge with shortest outermost legs 52c and 52d respectively. Radiused corners merge adjacent legs 52a-52d one with another, with the outer radiused portions being of greater diameter than the inner radii.

The ring 38, also of stainless steel, rests against the outermost face of disc 34 and assures affixation of disc 34 to backup member 36 by welding or the like without deformation of the peripheral margin of the plate 40.

An especially important feature of the bulkhead structure 24 is the way in which the portions of flat plate 40 which normally overlie each of the apertures 52 are bulged in a manner such that the bulged portions are complementally received within respective apertures. Thus, the bulged portions 54 are each dome-shaped to present concavo-convex surfaces which have a periphery that exactly registers with the shape of a corresponding aperture 52. Although not directly evident from the drawings, it is to be understood that the margins of face 50 of backup member 36 which define respective apertures 52 are slightly radiused in a direction extending from face 50 down into the apertures so that when pressure is exerted on rupture disc 34 and particularly against the individual domed portions 54, there is no tendency for the edges of the backup member defining the apertures to cut into or slice disc 34 thereby causing a rupture of the disc.

Furthermore, bulging and scoring of the disc 34 is carried out under conditions such that there is no tendency for the portions 54 to significantly further deform, or for the metal to separate along the score lines 42, 44 in plate 40, when a predetermined pressure is applied against disc 34 in a direction toward the face of disc 34 away from backup member 36. The score lines 42 and 44, as well as the grooves 45, are formed in the plate 40 after formation of bulges 54; if the reverse was carried out, the bulging operation could cause further weakening of the scored metal. This would result in unpredictable forward acting burst pressure properties.

In order to accomplish the intended goal, the initially flat plate 40 is bulged to form the individual domed portions 54 therein under a pressure greater than expected to be encountered when a disc 24 or 26 is actually installed in a rocket motor for a missile or the like. For example, if disc 24 (26) is designed to withstand 5,000 to 10,000 psig static backpressure in use, the plate 40 is bulged to form domed or dimpled portions 54 therein under a pressure which is above its rated withstand pressure. If the nominal withstand pressure is specified to be 7,000 psig, then bulging of the plate 40 should be under a pressure sufficiently above 7,000 psig such that in use of the bulkhead 24, the plate 40 will not undergo any additional deformation across apertures 52. It has been found, for example, that a pressure of about 2000 psi above the specification withstand back pressure is normally adequate to provide the requisite assurance that a disc will not deform when subjected to a static pressure of a specific value.

It is also noteworthy that the score lines 42, 44 are strategically located such that they directly overlie the segments 56 of body 48 defining legs 52a and 52b of each aperture 52. As a consequence, when pressure is applied against the face of disc 34 opposed to backup member 36, and in light of the ability of the domed portions 54 of plate 40 to resist further deformation, there is no tendency for the score lines to separate and allow leakage of gases through the disc 34.

The arcuate milled grooves or lines 45 are cut into the disc at the termination points of the score lines 42, 44 after the score lines have been formed in the disc, and extend in a direction generally perpendicular to the score lines. These milled grooves 45 define an arcuate line at the periphery of the disc 34 about which the petals defined by the lines 42, 44 bend during opening of the disc 34. In the absence of the milled grooves 45, the petals are restricted from opening completely when exposed to a forward acting burst pressure. However, by providing the milled grooves 45, the petals are permitted to bend more freely in the assembly than in known constructions, thus providing a larger opening for the passage of combustion products being discharged therethrough.

Returning to FIG. 1, it can be seen that the wall of the rocket portion 10 of the missile motor 12 extends radially inward of the assemblies 24, 26 by a distance substantially equal to the thickness of the ring 38. The purpose of providing this inner peripheral wall flush with the inner peripheral surface of the ring is to ensure that a stop surface is provided which will stop the outward movement of the petals during opening of the disc before the petals are permitted to bend so far as to break from the disc. Such premature breaking off of the petals in the assembly would create a threat that the nozzle motor will become clogged by the petal chunks, and would thus raise the potential for an explosion to occur or for the chunks to cause an undesired redirecting of the missle. By providing the stop surface, the petals are permitted to open only far enough to permit satisfactory discharge of the combustion products until such time as the petals melt completely away from the disc. It is noted that although the wall of the rocket portion 10 forms the stop surface in the illustrated embodiment, the ring could also be constructed as an elongated tube section such that the inner periphery of the ring would act as the stop surface.

In the second embodiment of the invention illustrated in FIGS. 7-9 inclusive, the basic elements are the same as those previously described with the exception being the shape and configuration of the apertures 152 in backup member 136. In the case of the second embodiment, the apertures 152 are of generally triangular configuration although again it is to be appreciated that the zones of merger of the sides of respective apertures are radiused to provide a smooth transition from each surface to the next adjacent surface. The bulged portions 154 of disc 134 are also configured to complementally be received within respective triangular apertures 152.

The third embodiment of the invention shown in FIGS. 10 and 11 has components as described with an exception that the apertures 252 are circular and the corresponding domed, bulged portions 254 of disc 234 are likewise of generally circular configuration.

In order to assure that bulkheads such as 24, 26 will withstand extremely high pressures against the face of disc 34 (or 134, 234) opposite a respective backup member 36 (or 136, 236), the back-up member must be of sufficient strength to provide adequate backup for the disc 34. Tests have demonstrated that for rocket motors to be used in missile applications, the ratio of the thickness of each disc to the thickness of the part of an associated backup member in supporting relationship thereto should be within the range of about 1:2 to about 1:40. Better results are obtained when such ratio is maintained within the range of about 1:8 to about 1:15 with the best ratio being about 1:10. Thus, in the case of a disc 34 (134, 234) having an overall diameter of about 1.9 inches and a diameter within ring 38 (138, 238) of about 1.75 inches, and using stainless steel having a thickness of about 0.030 inch, the thickness of the segments 56 of body 46 of backup member 36 (136, 236) should be about 0.28 inch.

Similarly, a preferred relationship should be maintained between the thickness of segments 56 with respect to the width thereof between adjacent apertures 52 (152, 252). Best results have been obtained if the ratio of the width of the segments of each backup member 36 (136, 236) between proximal apertures 52 (152, 252) to the thickness of such segments is maintained within the range of about 0.5:1 to about 1.5:1, more desirably within the range of about 0.7:1 to about 1:1 and preferably at about 0.8:1.

These values are particularly applicable to a stainless steel such as ASTM 631 (UNS designation S17700) having an assay of about 0.09 carbon, 1.00 manganese, 0.040 phosphorous, 0.030 sulfur, 1.00 silicon, 16.00–18.00 chromium, 6.50–7.75 nickel, 0.75–1.50 aluminum and the remainder iron. The specifications for type 631 stainless steel also call for the material to have been hardened and aged by heating the material to about 1,750° F. (954° C.) for not less than 10 minutes but not more than 1 hour followed by rapid cooling to room temperature.

Thereafter, the material should be cooled within 24 hours to −100+ 10° F. (73° C.) and then held at that temperature for not less than 8 hours. The metal is then warmed in air to room temperature, heated to 950° F. (510° C.) and held for 1 hour whereupon a final air cooling step is carried out. When so treated, the 631 type stainless steel has a minimum tensile strength of 185 ksi (1276 MPa), a minimum yield strength of 150 ksi (1034 MPa), an elongation (minimum percent in 2 inch or 50 millimeters) of 6, a minimum reduction of area in percent of 10, a minimum Rockwell C hardness of 41 and a minimum Brinell hardness of 388.

In order to maintain the disc supporting ability of the backup member while increasing the effective area of the apertures 52 (152, 252) presented to the propellant stage 20, each of the segments 56 (156, 256) are formed to define a T-shaped cross-section such as that illustrated in FIGS. 4, 9 and 11, wherein an upper cross-member 57 (157, 257) of each segment 56 (156, 256) contacts the disc 34 (134, 234), and an upstanding portion 59 (159, 259) extends outward from the cross-member 57 (157, 257) in a direction away from the disc 34 (134, 234). By constructing the segments 56 (156, 256) in this shape, the strength of the back-up member is substantially maintained, while the area of the apertures 52 (152, 252) is increased at the side of the member adjacent the propellant stage 20. During ignition of the propellant stages, the upper cross-portions of the T-shaped segments rapidly melt away from the segments and permit a large volume of combustion products to almost instantaneously pass from the missile. This increase in the area of the apertures further reduces the risk of pressure build-up within the motor beyond a predetermined limit value. It is noted that in addition to providing the above-mentioned advantages, the T-shaped construction of the segments 56 (156, 256) also reduces the weight of the motor, thus rendering the missile easier to transport. Although a T-shaped construction of the segments is illustrated in the preferred embodiment, it is possible to employ other cross-sectional shapes for the segments which provide satisfactory support to the disc while increasing the effective area of the apertures presented to the propellant stage 20 and reducing the weight of the assembly.

As shown in FIG. 11, it is also possible to remove material from the body 46 of the back-up member along the perimeter of each of the apertures 252 (52, 152) such that each aperture includes a disc support flange 261 extending around the entire periphery thereof adjacent the face 250 of the member 236. By constructing the backup member in this manner, the weight of the assembly 24 is further reduced, thus decreasing the overall weight of the missile motor 12.

Disc 34 is preconstructed such that it will open when pressure is applied thereagainst on the side thereof adjacent backup member 36, at a much lower value than is required to rupture the disc in the opposite direction through an outlet such as ring 38. For example, if the bulkhead structure 24 (26) is designed to withstand a static back pressure of 5,000 to 10,000 psig applied against the concavo dimpled face thereof, rupture disc 34 should fully open under a pressure thereagainst against of no more than about 30 to 400 psi and preferable in the range of 100 to 300 psi. In order to accomplish this low pressure opening, the scoring of the plate 40 is carried out in a manner such that application of a forward pressure against the disc 34 through associated backup member 36 causes the disc to readily rupture with the four petals defined by score lines 42, 44 opening up to present a full opening for passage of propellant products of combustion therethrough. The disc and backup member dimensions and materials of construction, and the depth, disposition and length of score lines 42, 44 preferably should be chosen such that the withstand back pressure is of a value at least 20 times the pressure at which the disc ruptures under a forward pressure against the opposite face thereof.

The material chosen for fabrication of backup member 36 (136, 236) is such that when disc 34 (134, 234) opens up as described upon application of a forward pressure thereon through the backup member, the segments 56 (156, 256) vaporize and rapidly erode away as depicted in FIG. 6 so as to not significantly impede free flow of gaseous combustion products through the bulkhead 24 (26.) A stainless steel of the composition described previously offers this desired property when the bulkhead structure is used in a high pressure rocket motor application.

It is especially important that the disc 34 be secured to backup member 36 in a manner such that gaseous products of combustion from ignition and burning of a propellant cannot bypass a bulkhead 24, 26 around the perimeter of the disc where it joins the backup member and that the disc plate 40 (140, 240) lie in flat engagement with the face 56 (156, 256) of a respective backup member 36 (136, 236). A further feature of the invention in this respect is the fact that the outer annular surface of body 46 of backup member 36 (as well as the other embodiments of the invention as depicted in FIGS. 7-11 inclusive) is threaded to permit threaded mounting thereof in the casing 14 of a rocket motor 10. This threaded interconnection precludes leakage of hot products of combustion pass the barrier presented by a respective bulkhead 24, 26.

We claim:

1. Rupture disc bulkhead structure for use in a multi-stage rocket motor having a casing provided with a gaseous products discharge port and a plurality of propellant stages adapted to be ignited in successive order commencing with the stage in closest proximity to the discharge port, said bulkhead structure comprising:

an essentially flat, non-apertured rupture disc presenting first and second disc faces and being adapted to be mounted in said casing between each adjacent pair of the propellant stages in full separating relationship thereto; and a multiple apertured backup member in flat engagement with the face of each disc opposed to the second face of the disc which is in direct contact with an adjacent propellant charge that has last been ignited, the backup member including a plurality of arm segments which at least partially define the apertures in the member, each of the discs being provided with a plurality of radially extending lines of weakness in the second face of a depth sufficient to cause rupture of that disc at a preselected pressure in a direction away from the backup member which is in supporting engagement with the disc, each line of weakness being aligned with one of the arm segments of the backup member such that the disc is able to withstand pressure thereagainst without rupture during ignition and burning of the last propellant stage to be ignited but to then rupture at a much lower pressure upon ignition of the propellant proximal to a corresponding backup member to allow free flow of gaseous propellant combustion products along a flow path extending through the bulkhead during burning of the latter propellant stage, each of the lines of weakness including a radially outer termination point, the discs being further provided with a groove formed in the second face and intersecting each termination point such that when the disc ruptures the disc is permitted to move substantially completely out of the flow path of the propellant combustion products by bending along the grooves.

2. Bulkhead structure for a multi-stage rocket motor as set forth in claim 1, wherein the lines of weakness form a cross in the second face of each disc.

3. Bulkhead structure for a multi-stage rocket motor as set forth in claim 2, wherein each of the discs includes bulged, dimpled defining portions that extend into the apertures of the backup member thereagainst, the bulging of the portions having been carried out under a pressure which exceeds the withstand pressure established for the disc against the face thereof opposed to the backup member so that significant deformation of the disc into the apertures of the backup member is precluded during ignition and burning of the propellant stage on the side of the disc opposed to a respective backup member.

4. Bulkhead structure for a multi-stage rocket motor as set forth in claim 3, wherein the bulge defining portions of each disc are each configured to substantially conform to the shape of the aperture in the backup member aligned with a respective bulged portion.

5. Bulkhead structure for a multi-stage rocket motor as set forth in claim 4, wherein said bulge defining portions of each disc are each of generally concavo-convex configuration.

6. Bulkhead structure for a multi-stage rocket motor as set forth in claim 1, wherein the backup member is of a material, shape and thickness such that the interior portion thereof defining at least a part of the aperture therein vaporizes and erodes during flow of gaseous propellant combustion products through the corresponding backup member and associated discs.

7. Bulkhead structure for a multi-stage rocket motor as set forth in claim 1, wherein each disc is fixedly attached to an associated backup member precluding leakage of gaseous propellant combustion products between each disc and its backup member around the perimeters thereof.

8. Bulkhead structure for a multi-stage rocket motor as set forth in claim 3, wherein said apertures in the backup member and the bulge defining portions of the disc received therein are generally rectangular in cross-sectional configuration and arranged symmetrically around the axis of the disc.

9. Bulkhead structure for a multi-stage rocket motor as set forth in claim 3, wherein said apertures in the backup member and the bulge defining portions of the disc received therein are generally triangular in cross-sectional configuration and arrange symmetrically around the axis of the disc.

10. Bulkhead structure for a multi-stage rocket motor as set forth in claim 3, wherein said apertures in the backup member and the bulge defining portions of the disc received therein are generally circular in cross-sectional configuration and arranged symmetrically around the axis of the disc.

11. Bulkhead structure for a multi-stage rocket motor as set forth in claim 3, wherein each of said discs is capable withstanding a pressure thereagainst in one direction of a value which exceeds at least about 20 times the pressure at which the disc ruptures in the opposite direction.

12. Bulkhead structure for a multi-stage rocket motor as set forth in claim 3, wherein said disc as backed up by the backup member is capable of withstanding a backpressure thereagainst is excess of 2000 psi and to open under a forward pressure in the opposite direction at a pressure less than about 400 psi.

13. Bulkhead structure for a multi-stage rocket motor as set forth in claim 11, wherein said disc as backed up by the backup member is capable of withstanding a back pressure thereagainst in the range of 5,000 to 10,000 static psi pressure, and to open under a forward pressure in the opposite direction within the range of about 100 to 400 static psi.

* * * * *